United States Patent [19]

You

[11] Patent Number: 5,414,558
[45] Date of Patent: May 9, 1995

[54] SCREEN FOR A PROJECTOR

[76] Inventor: Shy-Loong You, No. 356, Hsin-Hsing Rd., Yen-Tien Tsun, Yung-An Hsiang, Kaohsiung Hsien, Taiwan, Prov. of China

[21] Appl. No.: 195,641

[22] Filed: Feb. 14, 1994

[51] Int. Cl.⁶ .............................................. G03B 21/56
[52] U.S. Cl. .................................. 359/451; 359/443; 359/459
[58] Field of Search ........................ 359/443, 451, 459

[56] References Cited

U.S. PATENT DOCUMENTS

| | | | |
|---|---|---|---|
| 3,314,742 | 4/1967 | Morgan | 350/117 |
| 3,754,811 | 8/1973 | Hoadley et al. | 350/127 |
| 3,754,813 | 8/1973 | Depalma et al. | 350/127 |
| 3,964,822 | 6/1976 | Yamashita | 350/117 |
| 4,089,587 | 5/1978 | Schudel | 350/125 |
| 4,232,939 | 11/1980 | Kikuchi | 350/129 |
| 4,268,118 | 5/1981 | Palmquist et al. | 350/128 |
| 4,732,441 | 3/1988 | Cheng | 350/125 |

Primary Examiner—Richard A. Wintercorn
Attorney, Agent, or Firm—Harness, Dickey & Pierce

[57] ABSTRACT

A screen is used for a projector and includes a metal plate body and a plurality of elongated parallel streaks. The metal plate body has a concave reflection surface which is horizontally straight and vertically curved and which has a predetermined radius of curvature. The streaks protrude uniformly and densely from the reflection surface of the metal plate body and extend from the top end of the reflection surface to the bottom end of the reflection surface in a generally vertical direction. Any adjacent pair of the streaks are sized and spaced apart from each other at an interval of less than 5 microns so that the streaks function as a concave grating. The concave reflection surface is coated with a transparent film by immersing the metal plate body in a caustic solution so as to decrease interference from light sources other than the projector. Accordingly, when the screen is in use, the light emitted from the projector can form high contrast images on the concave reflection surface so as to provide a high image quality on the screen.

3 Claims, 6 Drawing Sheets

SCREEN FOR A PROJECTOR

BACKGROUND OF THE INVENTION

1. Field of the Invention

This invention relates to a screen for a projector, more particularly to a screen with a concave reflection surface which can provide increased gain and horizontal viewing cone for a viewer and which can decrease the reflected light emitted from light sources other than the projector.

2. Description of the Related Art

The improvement of this invention is directed to a conventional screen which is used for a projector.

Generally speaking, there are two principal types of conventional screens which are used for projectors. The first type of screen, such as a white linen has a wider viewing cone for a viewer, but its gain of screen is poor so that the images that fall on the screen can be clearly visible only under dim light conditions. The second type of screen, such as a metal which is coated with a piece of film, has a better gain of screen for the viewer, but its viewing cone is narrower than that of the first type so that the viewer can watch clearly the images on the screen only within a limited scope.

Because the conventional screen has an even reflection surface, light that is emitted from the projector is reflected from the even reflection surface of the screen only in a regular direction. The gain of the screen is in inverse proportion to the viewing cone of the screen. Accordingly, the gain and the viewing cone of the screen can not be increased simultaneously so that the practicability of the conventional screen is limited.

SUMMARY OF THIS INVENTION

The main objective of this invention is to provide a projector screen with a concave reflection surface which can increase simultaneously the gain and horizontal viewing cone of the screen.

Another objective of this invention is to provide a screen with a concave reflection surface that is coated with a transparent film so as to decrease the glaring light reflected from the reflection surface and emitted by a light source other than the projector.

According to this invention, a screen is used for a projector and includes a metal plate body and a plurality of elongated parallel streaks. The metal plate body has a concave reflection surface which is horizontally straight and vertically curved and which has a predetermined radius of curvature. The streaks protrude uniformly from the reflection surface of the metal plate body and extend from the top end of the reflection surface to the bottom end of the reflection surface in a generally vertical direction. Any adjacent pair of the streaks are arranged and spaced apart from each other at a distance so that the streaks function as a concave grating. The concave reflection surface is coated with a transparent film by immersing the metal plate body in a caustic solution so as to decrease interference from a light source other than the projector. Accordingly, when the screen is in use, the light emitted from the projector can form high contrast images on the concave reflection surface.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
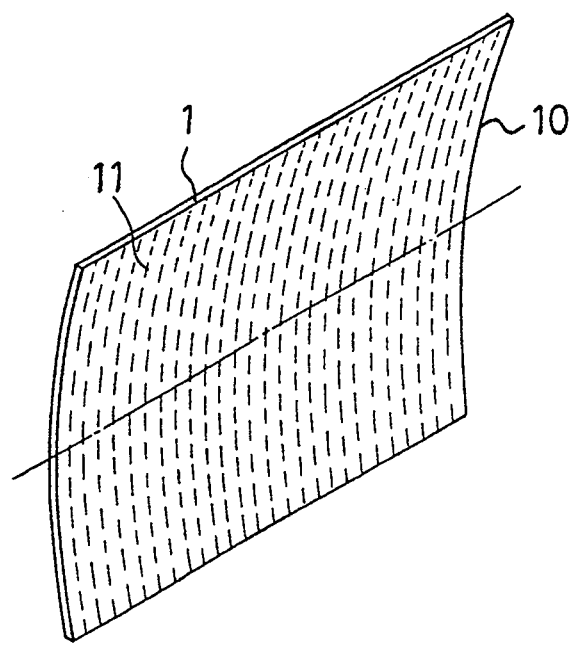
FIG. 1 is a schematic view illustrating the construction of the screen of this invention, the screen having a concave reflection surface and a plurality of parallel streaks protruding from the concave reflection surface.

Referring to FIG. 1, the screen of the preferred embodiment of this invention is used for a projector and includes a generally rectangular metal plate body 1 which is made of aluminum and which has a concave reflection surface 10. The concave reflection surface 10 of the metal plate body 1 is horizontally straight and vertically curved and has a predetermined radius of curvature. A plurality of elongated parallel streaks 11 protrude uniformly and densely from the concave reflection surface 10 and extend from the top end of the reflection surface 10 to the bottom end of the latter along a generally vertical direction by operating a series of mechanical works on the metal plate body 1. Each adjacent pair of the streaks 11 are spaced apart from each other at an interval of less than 5 microns. The concave reflection surface 10 of the metal plate body 1 is coated with a transparent film of aluminum oxide by immersing the metal plate body 1 in a caustic solution so as to decrease a glare which is a harsh uncomfortably bright light that is reflected from the concave reflection surface 10 and that is emitted from a light source other than the projector, thereby eliminating interference from light sources other than the projector.

Figure 2:
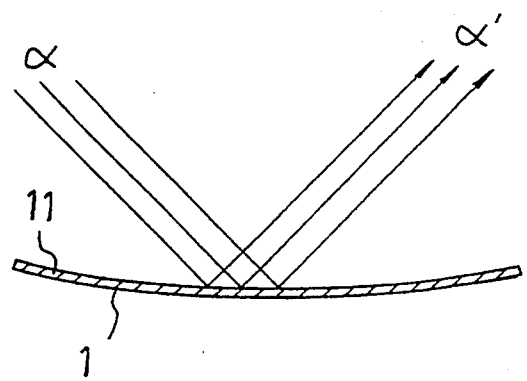
FIG. 2 illustrates how a regular angle is formed between the reflected light beams and the incident light beams when incident light beams advance along a vertical plane.

Referring to FIG. 2, in a case where the projector (not shown) is placed above the metal plate body 1, when the projector emits some light beams ($\alpha$) to the reflection surface 10 in such a manner that each of the light beams ($\alpha$) advances along a path which extends in a vertical plane that is perpendicular to the top and bottom sides of the metal plate body 1, each of the reflected light beams ($\alpha'$) is perpendicular to the incident light beam ($\alpha$) thereof. Accordingly, the light emitted from the projector can be reflected completely from the concave reflection surface 10 of the metal plate body 1 so as to increase the gain of screen. However, this results in the convergence of the reflected light beams (α') and the incident light beams (α) emitted from the projector cannot be effectively diffused.

Figure 3:
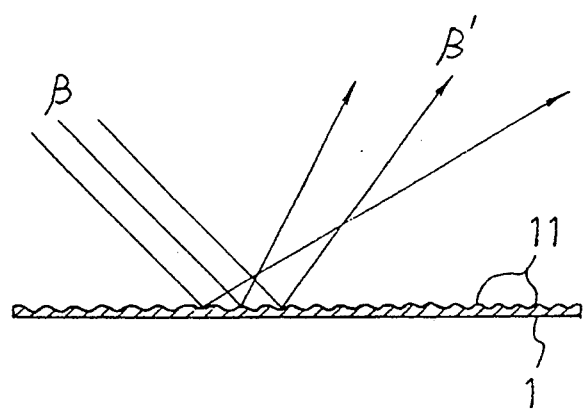
FIG. 3 illustrates how the irregular angles are formed between the reflected light beams and the incident light beams when the incident light beams advance along a horizontal plane.

Referring to FIG. 3, in a case where the projector (not shown) is placed on the right or left side of the metal plate body 1, when the projector emits some light beams (β) to the reflection surface 10 in such a manner that each of the light beams (β) advances along a path which extends in a horizontal plane, irregular angles are formed between the reflected light beams (β') and the incident light beams (β) thereof so as to diffuse the reflected light beams (β'), thus increasing the viewing cone of the screen. Because the diffusible condition of the reflected light beams (β') is in direct proportion to the density of the streaks 11, the more densely the streaks 11 are arranged, the more the reflected light beams (β') can be diffused. According to FIGS. 2 and 3, the streaks 11 can function as a concave grating which both converges and diverges the light falling upon it.

Figure 4:
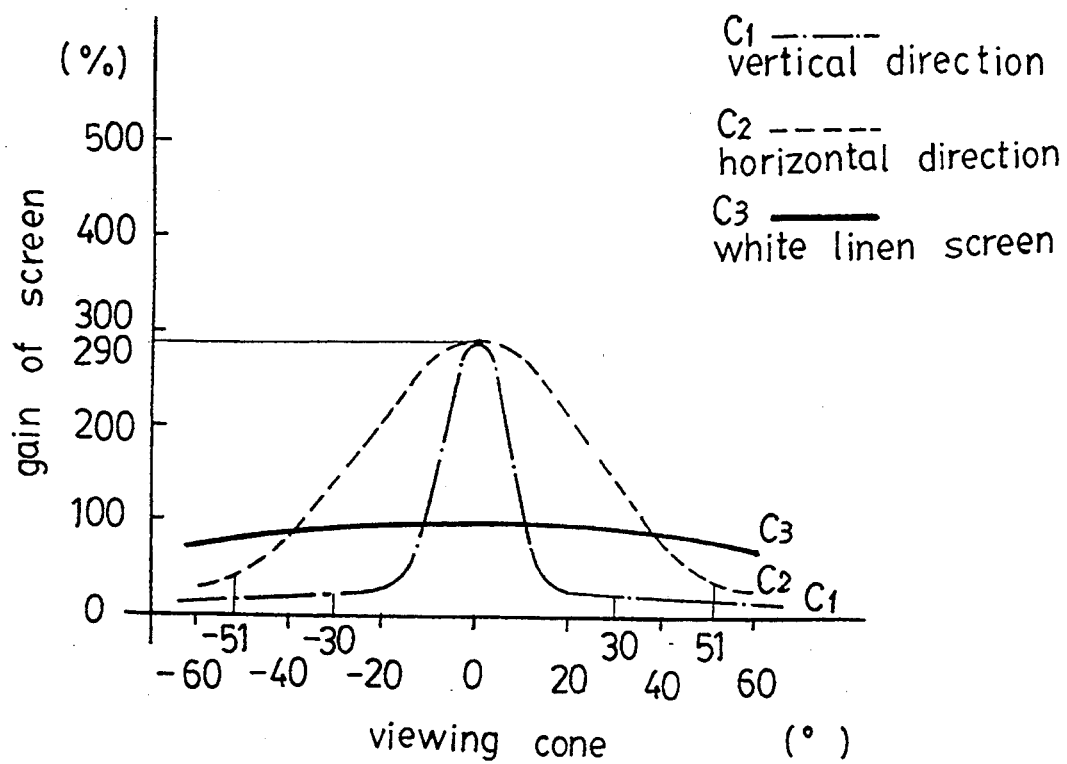
FIG. 4 is a graph illustrating the interrelation of the gain and viewing cone of a screen when the screen has an upright reflection surface which is horizontally and vertically straight.

FIG. 4 illustrates the interrelation of the gain and the viewing cone of a screen when the metal plate body 2 (see FIG. 8) of the screen has an upright reflection surface which is horizontally and vertically straight. As illustrated, the true line (C3) represents the first type of the conventional screen. The dotted line (C2) represents the light beams that fall on the upright reflection surface along a direction similar to that of the light beams (β) (shown in FIG. 3). The dotted line (C1) represents the light beams that fall on the flat reflection surface along a direction similar to that of the light beams (α) (shown in FIG. 2). When 1/10 of the maximum gain of the screen is used as the effective value of gain of the screen for measuring the viewing cone of the screen, the horizontal viewing cone of the screen, as shown by the dotted line (C2), is about 102 degrees, the vertical viewing cone of screen, as shown by the dotted line (C1), is about 60 degrees, and the maximum gain of the screen is 2.9 times better than the white linen screen. Because the light beams, when falling on the white linen screen, are almost completely diffused, its gain of the screen is defined as 1.0.

Figure 5:
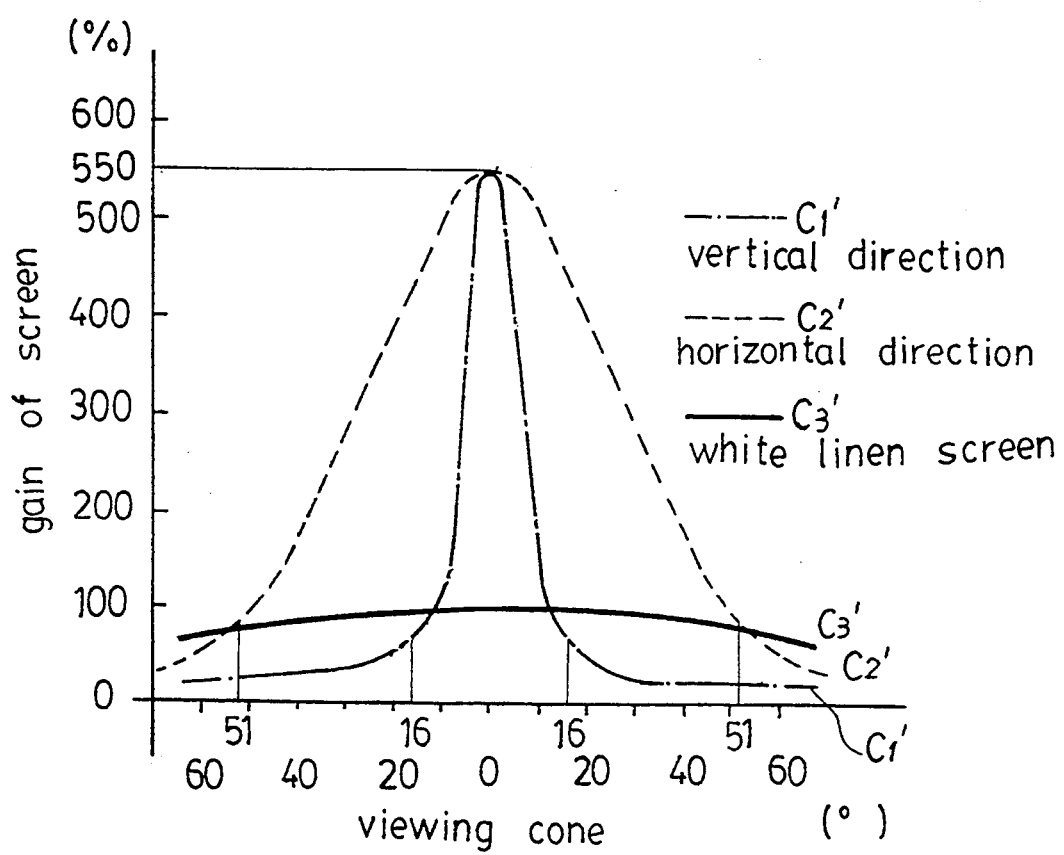
FIG. 5 is a graph illustrating the interrelation of the gain and viewing cone of the screen in accordance with this invention.

FIG. 5 illustrates the interrelation of the gain and viewing cone of the screen of this invention when the radius of curvature of the concave reflection surface of the screen is 3.5 meters. As illustrated, the true line (C3') represents the white linen screen. The dotted line (C2') represents the light beams that fall on the concave reflection surface along a direction similar to that of the light beams (β) (shown in FIG. 3). The dotted line (C1') represents the light beams that fall on the concave reflection surface along a direction similar to that of the light beams (α) (shown in FIG. 2). When 1/10 of the maximum gain of the screen is used as the effective value of gain of the screen for measuring the viewing cone of the screen, the horizontal viewing cone of screen, as shown by the dotted line (C2'), is about 102 degrees, the vertical viewing cone of the screen, as shown by the dotted line (C1'), is about 32 degrees, and the maximum gain of the screen is 5.5 times better than the upright reflection surface of the above described screen.

According to the above illustrations, when the upright reflection surface of the screen is bent to the concave reflection surface which is horizontally straight and vertically curved, the horizontal viewing cone of the screen is unchangeable, while the maximum gain of the screen is increased and the vertical viewing cone of the screen is decreased. The changed proportions between the upright reflection surface and the concave reflection surface of this invention are as follows:

$$\frac{60° \text{ (vertical viewing cone of screen of FIG. 4)}}{32° \text{ (vertical viewing cone of this invention)}} \approx 1.9$$

$$\frac{5.5 \text{ (gain of this invention)}}{2.9 \text{ (Gain of screen of FIG. 4)}} \approx 1.9$$

Accordingly, we can understand that the concave reflection surface can almost double the gain of the conventional screen corresponding to FIG. 4. Although the horizontal viewing cone of the concave reflection surface of the screen of this invention is decreased to 32 degrees, it does not have a large effect on the visible scope of a viewer when the viewer watches the screen at a distance of over about 3 meters from the screen.

Figure 6:
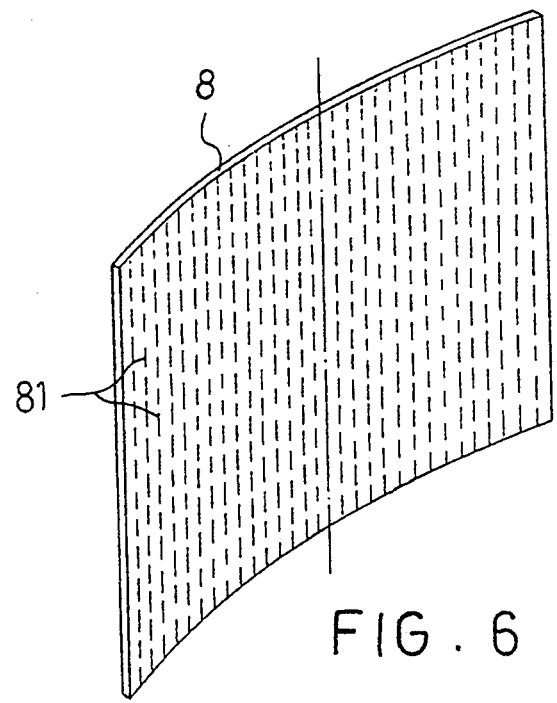
FIG. 6 is a schematic view illustrating another construction of the concave reflection surface of the screen.

Referring to FIG. 6, the metal plate body 8 of the screen has a concave reflection surface which is horizontally curved and vertically straight and which has a plurality of parallel vertical streaks 81 that protrude uniformly from the reflection surface and that are similar to those shown in FIG. 1. However, the test results of the metal plate body 8 of the screen are similar to those of the upright reflection surface of the screen, as shown in FIG. 4. Accordingly, the concave reflection surface of the metal plate body 8 offers no advantages to the screen.

Figure 7:
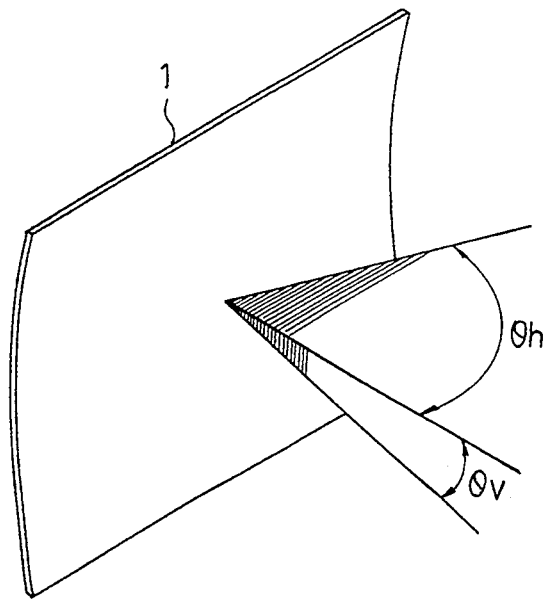
FIG. 7 is a schematic view illustrating the luminance range of the screen of this invention.

FIG. 7 illustrates the luminance range of the screen of this invention. As illustrated, the light emitted from the projector falls effectively on the concave reflection surface of the metal plate body 1 only within the horizontal viewing cone ($\theta$h) and within the vertical viewing cone ($\theta$v). Accordingly, the light reflected from the concave reflection surface of the screen of this invention but emitted from any light sources other than the projector can be decreased. As a result, the luminance contrast between the light from the projector and that from other light sources is increased. The luminance ratio of light from other light sources to that from the projector is as follows:

$$\frac{32° \ (Bv)}{180°} \times \frac{102° \ (Bh)}{180°} = 10\%$$

Accordingly, only about 10% of the light emitted from light sources other than the projector to the reflection surface can form visible images on the reflection surface of the screen of this invention. About 90% of the interference from light sources other than the projector is eliminated. As a result, the light emitted from the projector can form high contrast images on the reflection surface of the screen according to this invention, thereby increasing simultaneously the luminance contrast of the screen and the sharpness of the images.

Figure 8:
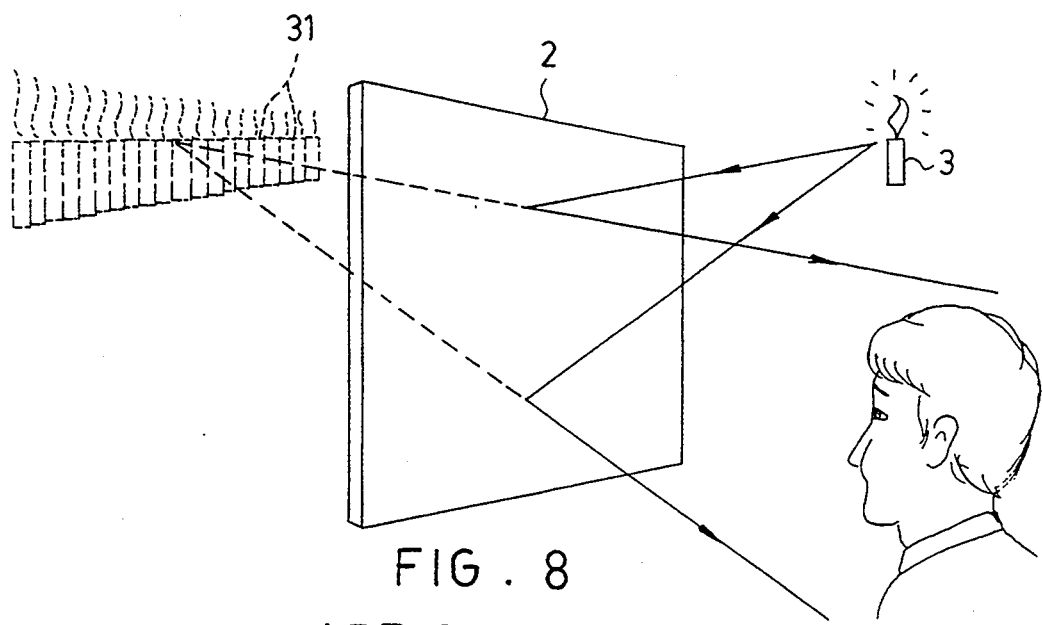
FIG. 8 illustrates how a glaring strip appears on the conventional screen.

The upright reflection surface of the metal plate body 2 of the screen has another disadvantage, as shown in FIG. 8. When the gain of screen is more than 4, the light beams emitted from the light source 3 result in striped virtual images 31 on the screen which come from the light beams falling on the streaks of the upright reflection surface. The striped virtual images 31 on the screen may cause a glaring strip to the viewer.

Figure 9:
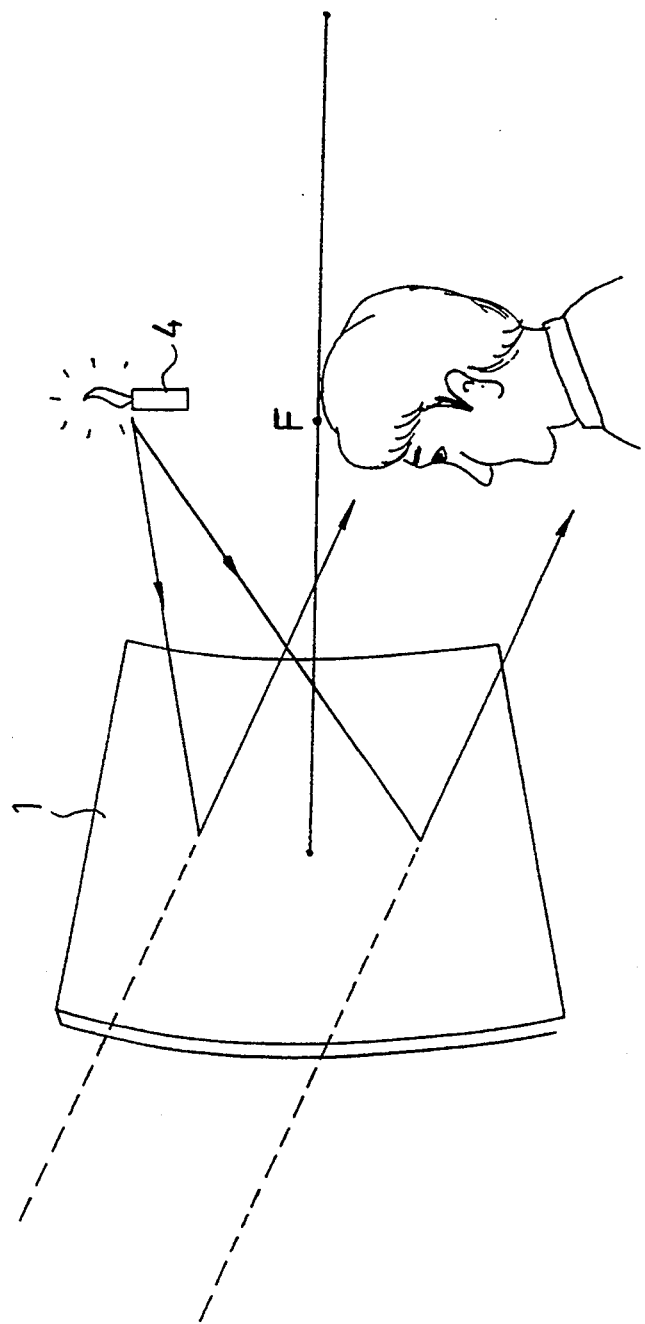
FIG. 9 illustrates how the screen of this invention eliminates the glaring strip of the conventional screen.

Referring to FIG. 9, the concave reflection surface of this invention can eliminate the virtual images of the upright reflection surface so as to eliminate the glaring strip on the screen. When a light source 4 is placed in front of the concave reflection surface of the metal plate body 1 at the focus (F) of the concave reflection surface, a distance of one half the radius of curvature, the light beams reflected from the concave reflection surface are parallel to each other so that the virtual images cannot be produced. Thus, the real images that fall on the concave reflection surface are visible clearly, thereby providing a high quality image on the screen.

With this invention thus explained, it is apparent that numerous modifications and variations can be made without departing from the scope and spirit of this invention. It is therefore intended that this invention be limited only as indicated in the appended claims.

I claim:

1. A screen for a projector, said screen being used for reflecting light emitted from said projector and comprising:

a metal plate body having a concave reflection surface which is horizontally straight and vertically curved and which has a predetermined radius of curvature; and a plurality of elongated parallel streaks protruding uniformly from said reflection surface and extending from a top end of said reflection surface to a bottom end of said reflection surface in a generally vertical direction, any adjacent pair of said streaks being arranged and spaced apart from each other at a distance so that said streaks function as a concave grating, said concave reflection surface being coated with a transparent film by immersing said metal plate body in a caustic solution so as to decrease interference from light sources other than said projector;

whereby, when said screen is in use, said light emitted from said projector can form high contrast images on said concave reflection surface.

2. A screen as claimed in claim 1, wherein each adjacent pair of said streaks are spaced apart by an interval of less than 5 microns.

3. A screen as claimed in claim 1, wherein said metal plate body is made of aluminum.

* * * * *